Sept. 11, 1934.   A. G. F. WALLGREN   1,973,131
BEARING AND MANUFACTURE THEREOF
Filed Aug. 22, 1929
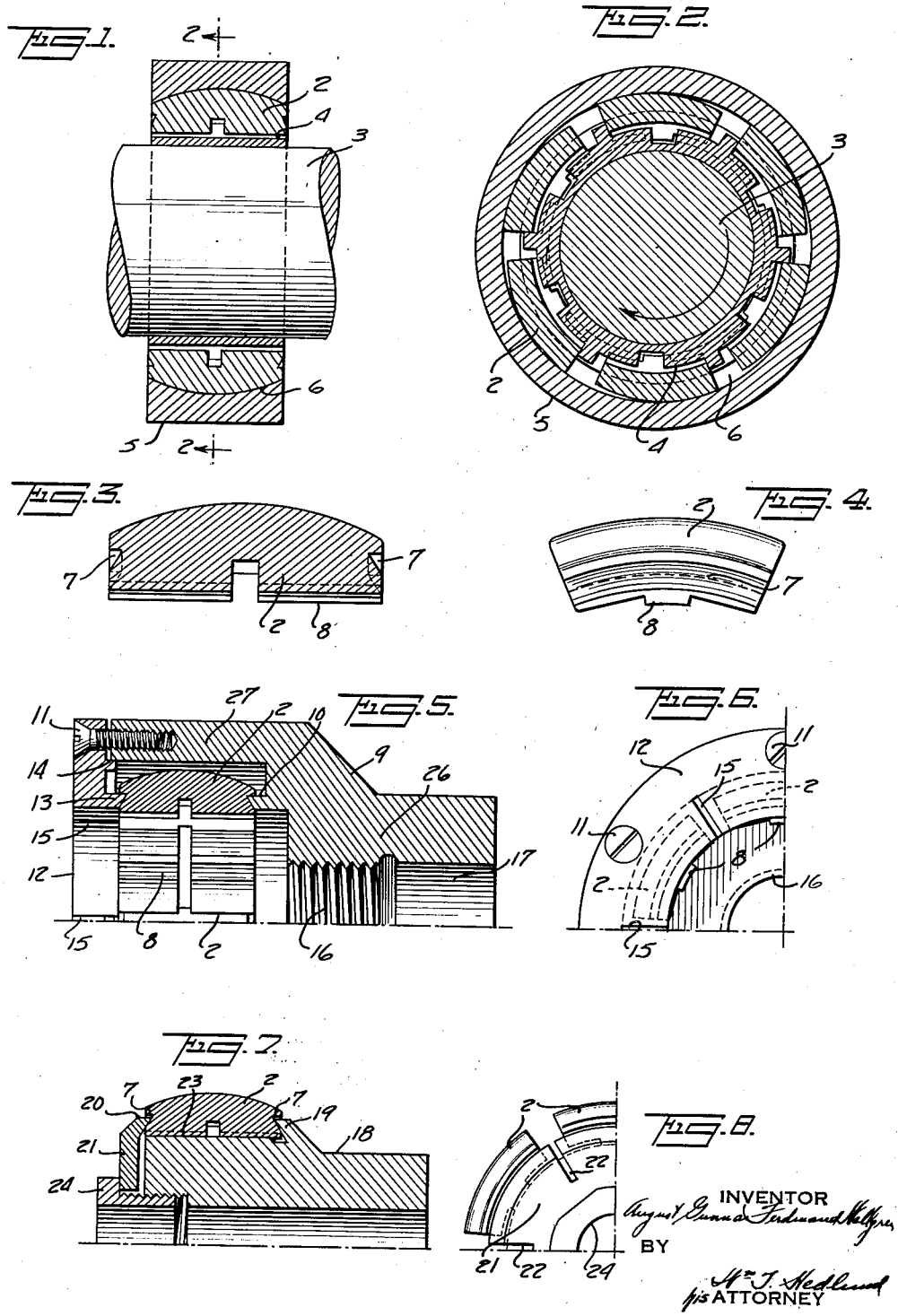
INVENTOR
August Gunnar Ferdinand Wallgren
BY
Wm. J. Hedlund
his ATTORNEY Patented Sept. 11, 1934

1,973,131

UNITED STATES PATENT OFFICE 1,973,131

BEARING AND MANUFACTURE THEREOF

August Gunnar Ferdinand Wallgren, Stockholm, Sweden, assignor to Aktiebolaget Nomy, Stockholm, Sweden, a corporation of Sweden Application August 22, 1929, Serial No. 387,781
In Sweden January 8, 1929

5 Claims. (Cl. 279—8)

My invention relates to bearings and more particularly to bearings of the type wherein a plurality of bearing blocks are, so to speak, tilted to give wedge-like oil spaces between relatively moving surfaces. Still more particularly my invention relates to bearings of this type wherein the bearing surfaces of the blocks are spherical or substantially spherical.

In bearings of this type it is important that the blocks be so accurately made and finished that the proper oil films having proper thickness are produced and maintained. This is particularly true when the bearing blocks are arranged to rotate. One important factor is that the bearing surfaces of all of the blocks in the same bearing be identical.

The blocks must be made of hardened or tempered material and some distortion is always present as a result of hardening. Consequently it is necessary to finish the block surfaces to final form after the hardening process. In view of the shape of blocks of this type it is difficult to retain them in chucks or jigs for the purpose of finishing the surfaces. Furthermore it is desirable to finish together and in one operation all of the blocks pertaining to the same bearing in order to obtain exactly the same dimensions on all the blocks.

The object of the present invention is to provide bearing blocks and chucks or jigs therefor and a novel method of manufacture of the blocks whereby the finishing process is facilitated, whereby exact dimensions of all blocks for the same bearing can be obtained in a single operation and whereby the blocks are readily and securely held in order to give exact dimensions.

The invention will be further described with reference to the accompanying illustrations, forming part of this specification and of which:

Fig. 1 is a cross-sectional view of the bearing;

Fig. 2 is a cross-sectional view taken on the line 2—2 of Fig. 1;

Fig. 3 is a cross-sectional view, on enlarged scale, of a bearing block forming part of the bearing of Fig. 1;

Fig. 4 is a side view of the bearing block shown in Fig. 3;

Fig. 5 is a cross-sectional view of a portion of a chuck or jig showing bearing blocks held therein;

Fig. 6 is an end view of the chuck or jig shown in Fig. 5;

Fig. 7 is a cross-sectional view of another chuck or jig; and

Fig. 8 is an end view of the chuck or jig shown in Fig. 7.

In the illustrations, reference character 2 designates bearing blocks which rotate with shaft 3 as shaft 3 is rotated. A ring member 4 is secured to rotate with shaft 3. This ring member has projections and surfaces, and inside portions of the blocks including the inside major faces thereof have cooperating projections and surfaces whereby the blocks are caused to rotate with the shaft and have certain movement involving slight tilting and certain radial and peripheral movements relative to ring 4. These surfaces include radial load transmitting surfaces which may be termed supporting surfaces. Ring member 4 and blocks 2 may be constructed in accordance with the disclosure of my co-pending application serial No. 277,769 filed May 14, 1928, Patent No. 1,871,485, to which further reference may be had for the specific form and action of devices of this type. By means of the arrangement of projections and surfaces on the ring 4 and blocks 2 respectively, on rotation of the shaft, the blocks adjust themselves so that there is more of a space between each block and the inside bearing surface of stationary ring 5 at the forward end of the block in the direction of rotation than there is at the rear end of the block. This is indicated in Fig. 2. Fig. 2 shows the relation of parts for rotation as indicated by the arrow. The stationary bearing surface which is on the inside of member 5 and is designated by reference character 6 is preferably spherical in form. The oil film is formed between surface 6 on member 5 and the major spherical-shaped faces of the blocks. As will be evident, the inside major faces may be said to be of irregular shape, particularly as compared to the outer spherically shaped major faces. The arrangement is such, as described in my aforesaid co-pending application, that when rotation is reversed, the blocks shift and tilt in the reverse direction so that, regardless of the direction of rotation, there is always the greater oil film space at the forward end of the block in the direction of rotation. In the wedge-shaped oil film spaces between the blocks and surface 6, oil films are produced which are capable of sustaining very heavy loads.

In accordance with the invention, the blocks are provided on each of their two opposite parallel sides, as shown in Fig. 3, with grooves 7. These grooves are preferably wedge-shaped as shown and are circular, the circle of the grooves being swung about the axis of rotation of shaft 3. These grooves aid in finishing the bearing blocks to perfect shape in the following manner: After suitable operations on an annular piece of rough material to give it a form suitable for cutting blocks out of it, and having cut grooves 7 in the same, as by turning on a lathe, the blocks are cut out from such material and are made to undergo a hardening process. After the hardening process all of the blocks pertaining to one bearing are fitted into a chuck or jig of the type shown in Fig. 5 in which the finished surfacing of the inside surfaces of the block is carried out. That is, the supporting surfaces are finished in this type of chuck or jig. This chuck or jig comprises a body portion 9, in turn comprising an attaching portion 26 and a circumferential portion 27. The attaching portion 26 comprises thread 16 and a guide surface 17 whereby the chuck or jig can be secured to a spindle or other part of a machine. The body of the chuck or jig is provided with a circular outwardly extending wedge-shaped projection 10. The slant surface of member 10 corresponds to the slant surface of the groove 7 of Fig. 3. The blocks are placed inside the circumferential portion 27 so as to engage projection 10 and then are clamped into the chuck or jig by means comprising said projection 10 and a corresponding projection or projections 13 on an annular plate-like member 12 which is secured to the body of the chuck or jig by means of a number of screws 11. Projection 13 is also wedgeshaped to correspond to the groove 7. This gives a fixed position to the blocks 2. Plate 12 is provided with a guide surface 14 in order to provide accurate alignment with respect to the body 9 of the chuck or jig. It will be seen that the diameter of projection 10 is the same as the diameter of projection 13. In this chuck or jig all the blocks pertaining to one bearing can be machined at the same time so that their inner supporting surfaces, such as surface 8, can be made exactly to the dimensions and form desired.

After the completion of this operation, the blocks are arranged on another chuck or jig of the type shown in Fig. 7 and Fig. 8. This is for the purpose of finishing the spherical bearing surfaces. This chuck or jig also comprises a body 18 which is provided with a circular projection 19, the form of which corresponds to the grooves 7 in the blocks. The blocks are arranged so they co-act with projection 19. A plate 21 constitutes the retaining member. It is moved toward body 18 by means of a screw member 24. The diameter of the wedge projecting portion 20 of plate 21 is the same as the diameter of the wedge projection 19. The blocks are held firmly between the projections or jaws 19 and 20. Member 21 may be slit inwardly as shown at 22 so that it has some elasticity and will provide individual forces against the different bearing blocks firmly securing the blocks between projections 19 and 20 and also, due to the form of the parts, forcing the blocks tight against the cylindrical surface 23.

In order to obtain the same individual forces applied to different blocks in the chuck or jig shown in Figs. 5 and 6, like slits 15 may be provided in retaining member 12.

It will be seen that the blocks placed in the chuck or jig shown in Fig. 7 and Fig. 8 can be ground to an outer surface of the desired form. In the present instance this surface is spherical and has exactly the same radius of curvature as the bearing surface 6 in the journal member 5. Since there must be a certain oil film space between the blocks and the sliding surface of the journal member 5 the diameter determining surface 6 should be somewhat greater than the diameter of the sphere within which the blocks are arranged. This can readily be taken care of by suitably dimensioning the diameter of surface 23. This diameter therefore should be somewhat greater than the diameter of the surface of ring 4 which contacts with the insides of the blocks.

From the above description it will be seen that the grooves in the blocks not alone permit the ready securing of the blocks in the chuck or jig but, by means of these grooves and their shape, the exact dimensioning of the blocks is obtained.

Obviously the invention is not limited to the forms and shapes or constructions shown, but the shapes, form and apparatus may be varied within the spirit and scope of the invention.

What I claim is:

1. A chuck or jig for finishing bearing blocks having a curved surface on one major face and supporting surfaces on another major face, comprising a body having an attaching portion and a circumferential portion and means for clamping a plurality of bearing blocks within the circumferential portion comprising a circular wedgeshaped projection on said body of given diameter, a retaining member having a circular wedge-shaped projection of the same given diameter and means to secure said retaining member to said body, said retaining member consisting of an annular plate-like member having slits in the ame.

2. A chuck or jig for finishing bearing blocks having a curved surface on one major face and supporting surfaces on another major face, comprising a body having an annular portion and means for clamping a plurality of bearing blocks around said annular portion comprising a circular wedge-shaped projection on said body of given diameter, a retaining member having a circular wedge-shaped projection of the same given diameter and means to draw the retaining member towards said body whereby the wedge-shaped members act to press the bearing blocks against said annular portion, said retaining member consisting of an annular plate-like member having slits in the same and being slightly elastic.

3. A chuck or jig for simultaneously holding a plurality of bearing blocks having a curved surface on one major face and supporting surfaces on another major face, comprising a body having an attaching portion and a circumferential portion, and means for concurrently clamping the blocks within the circumferential portion comprising a circular wedge shaped projection on said body, and a retaining member providing a plurality of radially extending fingers each having an arcuate wedge shaped projection thereon adapted to engage one of said blocks, and means to secure said retaining member to said body.

4. A chuck or jig for finishing bearing blocks having a curved surface on one major face and supporting surfaces on another major face, comprising a body having an annular portion and means for clamping a plurality of bearing blocks adjacent said annular portion comprising projecting engaging means on said body adapted to engage one side of each of said blocks, a retaining member providing a plurality of radially extending fingers each having projecting engaging means adapted to engage the opposite side of said blocks, there being at least one finger for each block, and means to secure said retaining member to said body.

5. A chuck or jig for simultaneously holding a plurality of bearing blocks having a curved surface on one major face and supporting surfaces on another major face, comprising a body having an annular portion, and means for concurrently clamping the blocks adjacent to the annular portion comprising circular members having wedge shaped edges adapted to engage grooves in the sides of the blocks and to draw the blocks against said annular portion, one of aid members being formed of slightly elastic material and having slits forming a plurality of radially extending fingers, and means for drawing said members towards each other.

AUGUST GUNNAR FERDINAND WALLGREN.